RADIATION SENSITIVE NOTCH PATTERN DETECTION SYSTEM

Filed March 28, 1968 3 Sheets-Sheet 1

RADIATION SENSITIVE NOTCH PATTERN DETECTION SYSTEM

Filed March 28, 1968 3 Sheets-Sheet 2

LOGIC TABLE SHOWING RESPONSE OF FIG. 5 LOGIC CIRCUITRY TO SPURIOUS NOTCH

| FIG. 3 SIGNAL CONDITIONS | BINARY STATE OF FIG. 5 CIRCUIT POINTS | | | | | | | | | RELAY 31 OUTPUT |
|---|---|---|---|---|---|---|---|---|---|---|
| | A | B | C | D | E | F | G | H | I | |
| INIT. COND. | 0 | 0 | 1 | 1 | 1 | 1 | 0 | 0 | 0 | NO CUE |
| a | 1 | 0 | 0 | 1 | 1 | 1 | 1 | 0 | 0 | NO CUE |
| b | 0 | 0 | 1 | 1 | 1 | 1 | 0 | 0 | 0 | NO CUE |
| d | 0 | 1 | 1 | 0 | 1 | 1 | 0 | 1 | 0 | NO CUE |
| e | 0 | 0 | 1 | 1 | 1 | 1 | 0 | 0 | 0 | NO CUE |

FIG. 7

LOGIC TABLE SHOWING RESPONSE OF FIG. 5 LOGIC CIRCUITRY TO NOTCH CUE

| FIG. 4a SIGNAL CONDITIONS | BINARY STATE OF FIG. 5 CIRCUIT POINTS | | | | | | | | | RELAY 31 OUTPUT |
|---|---|---|---|---|---|---|---|---|---|---|
| | A | B | C | D | E | F | G | H | I | |
| INIT. COND. | 0 | 0 | 1 | 1 | 1 | 1 | 0 | 0 | 0 | NO CUE |
| a | 1 | 0 | 0 | 1 | 1 | 1 | 1 | 0 | 0 | NO CUE |
| d | 1 | 1 | 0 | 0 | 0 | 0 | 1 | 1 | 0 | NO CUE |
| b | 0 | 1 | 1 | 0 | 1 | 0 | 0 | 1 | 0 | NO CUE |
| e | 0 | 0 | 1 | 1 | 1 | 0 | 0 | 0 | 1 | CUE |
| j | 0 | 0 | 1 | 1 | 1 | 1 | 0 | 0 | 0 | NO CUE |

CUE INDICATION SENT TO CONTROLLED EQUIPMENT AND RESET SIGNAL SENT TO FLIP-FLOP 27

FIG. 8

LOGIC TABLE SHOWING RESPONSE OF FIG. 5 LOGIC CIRCUITRY TO CANCELLED NOTCH CUE (RIBBON MOVING L TO R)

| FIG. 4b SIGNAL CONDITIONS | BINARY STATE OF FIG. 5 CIRCUIT POINTS | | | | | | | | | RELAY 31 OUTPUT |
|---|---|---|---|---|---|---|---|---|---|---|
| | A | B | C | D | E | F | G | H | I | |
| INIT. COND. | 0 | 0 | 1 | 1 | 1 | 1 | 0 | 0 | 0 | NO CUE |
| a | 1 | 0 | 0 | 1 | 1 | 1 | 1 | 0 | 0 | NO CUE |
| b | 0 | 0 | 1 | 1 | 1 | 1 | 0 | 0 | 0 | NO CUE |
| c | 1 | 0 | 0 | 1 | 1 | 1 | 1 | 0 | 0 | NO CUE |
| e | 1 | 1 | 0 | 0 | 0 | 0 | 1 | 1 | 0 | NO CUE |
| f | 1 | 0 | 0 | 1 | 1 | 0 | 1 | 0 | 0 | NO CUE |
| g | 1 | 1 | 0 | 0 | 0 | 1 | 1 | 1 | 0 | NO CUE |
| d | 0 | 1 | 1 | 0 | 1 | 1 | 0 | 1 | 0 | NO CUE |
| h | 0 | 0 | 1 | 1 | 1 | 1 | 0 | 0 | 0 | NO CUE |

FIG. 9

LOGIC TABLE SHOWING RESPONSE OF FIG. 5 LOGIC CIRCUITRY TO CANCELLED NOTCH CUE (RIBBON MOVING R TO L)

| FIG. 4b SIGNAL CONDITIONS | BINARY STATE OF FIG. 5 CIRCUIT POINTS | | | | | | | | | RELAY 31 OUTPUT |
|---|---|---|---|---|---|---|---|---|---|---|
| | A | B | C | D | E | F | G | H | I | |
| INIT. COND. | 0 | 0 | 1 | 1 | 1 | 1 | 0 | 0 | 0 | NO CUE |
| h | 0 | 1 | 1 | 0 | 1 | 1 | 0 | 1 | 0 | NO CUE |
| d | 1 | 1 | 0 | 0 | 0 | 0 | 1 | 1 | 0 | NO CUE |
| g | 1 | 0 | 0 | 1 | 1 | 0 | 1 | 0 | 0 | NO CUE |
| f | 1 | 1 | 0 | 0 | 0 | 1 | 1 | 1 | 0 | NO CUE |
| e | 1 | 0 | 0 | 1 | 1 | 1 | 1 | 0 | 0 | NO CUE |
| c | 0 | 0 | 1 | 1 | 1 | 1 | 0 | 0 | 0 | NO CUE |
| b | 1 | 0 | 0 | 1 | 1 | 1 | 1 | 0 | 0 | NO CUE |
| a | 0 | 0 | 1 | 1 | 1 | 1 | 0 | 0 | 0 | NO CUE |

FIG. 10

1

3,541,339

RADIATION SENSITIVE NOTCH PATTERN DETECTION SYSTEM

Karl M. St. John, Huntington Station, and Sheldon J. Kerbel, Merrick, N.Y., assignors by mesne assignments, to Hazeltine Corporation Filed Mar. 28, 1968, Ser. No. 716,930
Int. Cl. G08c 9/06
U.S. Cl. 250—219 10 Claims

ABSTRACT OF THE DISCLOSURE

Disclosed is apparatus for detecting the presence of a selected notch pattern in a moving ribbon of material as the ribbon moves through an observation position. The apparatus supplies two radiation beams, each along an axis which intersects the observation position and any ribbon moving therethrough. Another portion of the apparatus, namely a pair of radiation detectors coupled to logic circuitry, is responsive to the beams of radiation and to the effect produced thereon by the movement through the observation position of an increment of the ribbon bearing a selected notch pattern, and develops an output indication each time such an increment bearing the selected notch pattern moves through the observation position. Other embodiments are covered.

Figure 1:
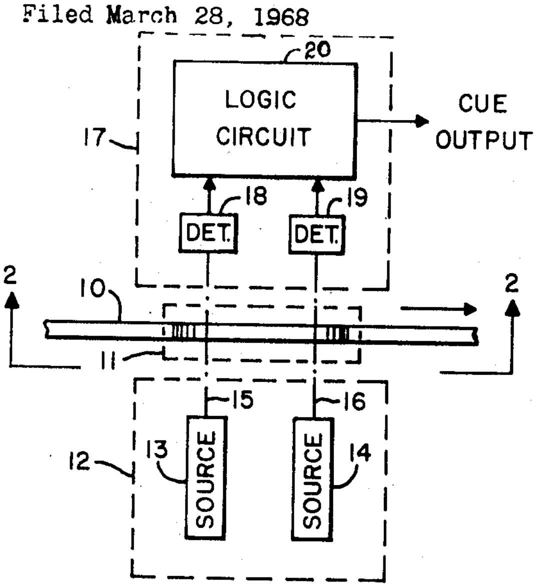

The present invention relates generally to a notch pattern detection system, and more particularly, to an improved notch-type cuing system which does not require the use of mechanical notch sensors and yet, is compatible with the conventional prior art notch-type cuing system that is now widely used in the film processing industry.

In the film processing industry there has been in use for many years a cuing system which employs as a cue, a single, elongated, relatively deep notch cut in the edge of the ribbon of film. As the film is run through an observation position, the mechanical arm of a microswitch, for example, rides the notched edge of the film. As an increment of film bearing a notch passes through the observation position, the arm of the microswitch falls into the notch, thus momentarily activating the switch, which provides an indication of the presence of a notch-type cue in the film. The cue indication is generally used in a known manner to control equipment which prints, previews, analyzes, or otherwise processes the film.

This prior art notch-type cuing system has many obvious disadvantages and limitations. First, mechanical notch sensing mechanisms, such as the aforementioned microswitch, necessarily exert pressure on the film edge, thereby causing the film to wear and weaken. Secondly, the depth of the notch required to insure reliable mechanical operation of such notch sensors is appreciable, and therefore inherently weakens a film increment containing the notch. Thirdly, to cancel a prior art notch-type cue it has heretofore been necessary to actually fill in the notch with some substance in order to prevent the mechanical notch sensor from being activated. This cue cancellation technique is proved to be greatly troublesome and unreliable.

Other prior art cuing systems which do not use notch-type cues have been devised, but each is beset with limitations and disadvantages similar to those of the conventional notch-type system described above. One such prior art cuing system, for example, utilizes a small patch of metallic foil or conductive paint applied to the film at the desired cue location. As the film increment bearing the cue is run through an observation position, the presence of the foil or conductive paint patch is detected by the effect it exerts on an RF circuit located adjacent the moving film. While mechanical contact between the film and the cue sensor is eliminated, a more serious problem is created in that the foil or paint patch tends to dislodge from the film during processing and handling, thus destroying the cues. By far the most serious limitation of this system is the fact that it is wholly incompatible with the more commonly used notch-type cuing system. Thus, the vast library of film which has been cued for use with the prior art notch-type cuing system cannot be processed in the cuing system just described, and vice versa.

2

Another prior art cuing system utilizes a small patch of highly reflective or opaque paint or dye applied to the film at the desired cue location. A light source and photodetector are arranged to detect the change in reflectivity or transmissivity caused by the reflective or opaque patch. Here again, the major disadvantage is the fact that this system is not compatible with the more commonly used notch-type cuing system. Furthermore, like the foil patches, the reflective or opaque paint patches tend to wear off or dislodge from the film, thereby destroying the cues.

Thus, it can be seen that the three major criteria which must necessarily be met by a cuing system in order to be a substantial improvement over the prior art and yet be commercially acceptable are:

(1) A cue must be easily applied, become a permanent part of the film without appreciably weakening it and yet be readily cancellable.

(2) The cue sensor must not contact the film, so that film wear is reduced to a minimum.

(3) Compatibility, particularly with the widely used present day notch-type cuing system, is required.

It is therefore an object of the present invention to provide a new and improved notch-type cuing system which satisfies all three of the above criteria.

It is another object of the present invention to provide an improved notch-type cuing system which is particularly simple, reliable, easy to use and relatively inexpensive.

In accordance with the present invention apparatus for detecting the presence of a selected notch-pattern in a moving-ribbon of material, as the material moves through an observation position, comprises means for supplying at least two beams of radiation, each along an axis which intersects the observation position and any ribbon of material moving therethrough and radiation detection means, responsive to the beams of radiation and to the effect produced thereon by the movement through the observation position of an increment of the ribbon bearing the selected notch pattern, for developing an output indication each time an increment bearing the selected notch pattern moves through the observation position.

For a better understanding of the present invention together with other and further objects thereof, reference is had to the following description taken in connection with the accompanying drawings, and its scope will be pointed out in the appended claims.

Figure 3:
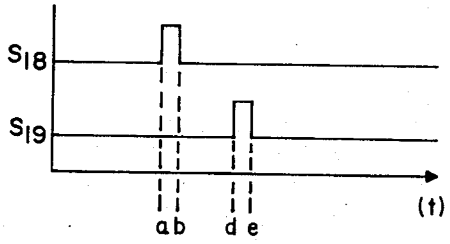
Figure 2A:
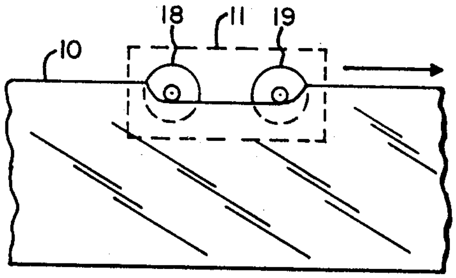
Figure 4A:
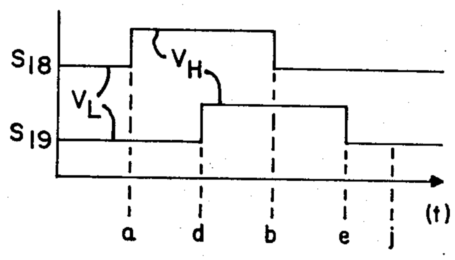
Figure 2B:
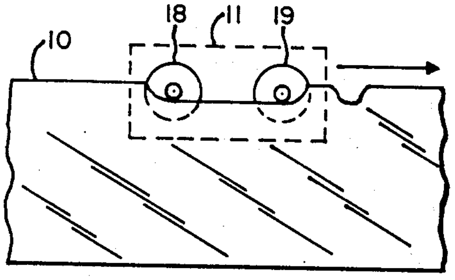
Figure 4B:
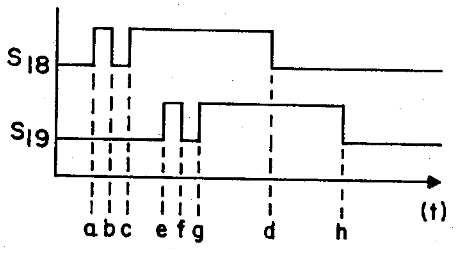
Figure 5:
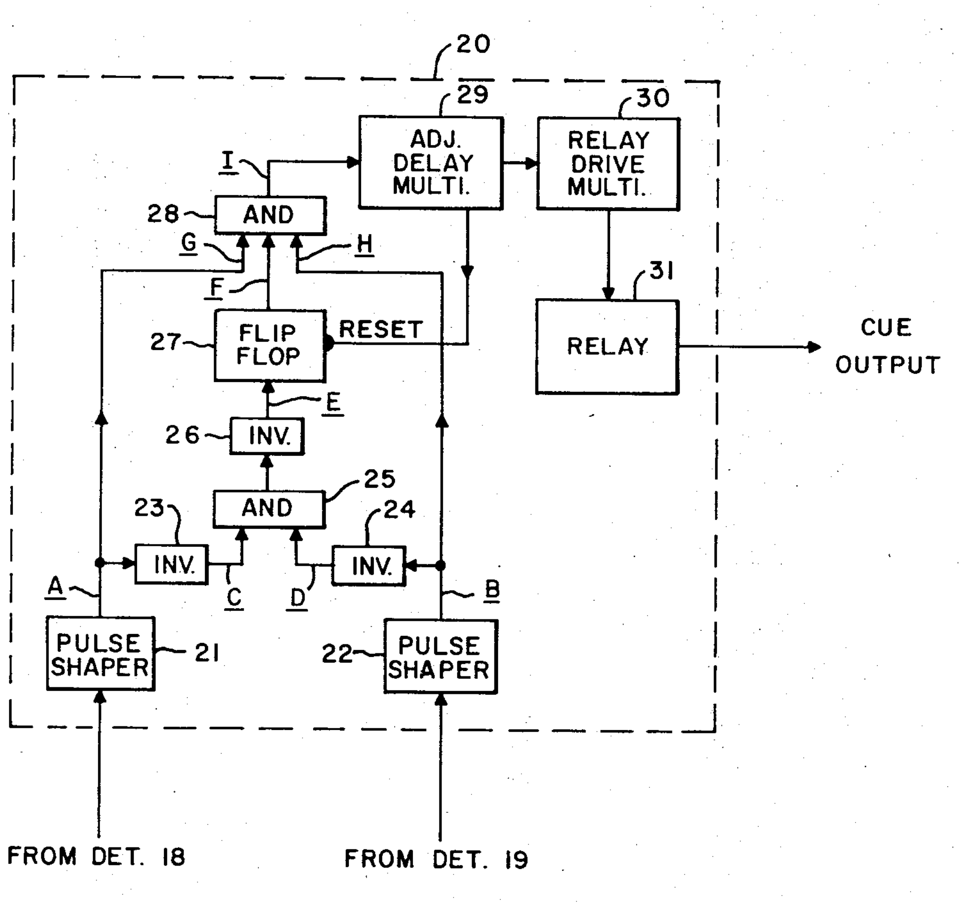
Figure 6:
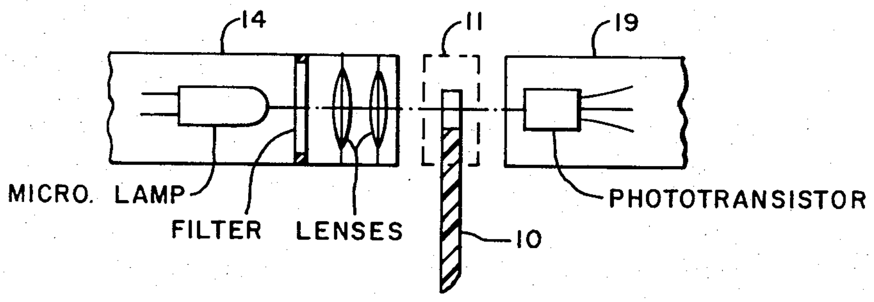

Referring to the drawings:

FIG. 1 is a block diagram of a cue detection system embodying one form of the invention;

FIG. 2*a* is a sectional view of the cue detection system of FIG. 1;

FIG. 2*b* is a sectional view of the cue detection system of FIG. 1 illustrating a different notch pattern;

FIGS. 3, 4*a* and 4*b* are signal diagrams useful in explaining the operation of the cue detection system of FIG. 1;

FIG. 5 is one arrangement of logic components which may be used as the logic circuit means 20 of FIG. 1;

FIG. 6 is a schematic diagram illustrating one arrangement of the radiation source 14 and photodetector 19 of FIG. 1, and FIGS. 7, 8, 9 and 10 are logic tables useful in explaining the operation of the logic component arrangement of FIG. 5.

DESCRIPTION OF THE SYSTEM OF FIG. 1

In FIG. 1 there is shown one embodiment of an improved notch-type cuing system constructed in accordance with the present invention. In the embodiment of FIG. 1, and increment of a ribbon of material 10 (which is shown enlarged and in edge view) is assumed to be moving from left to right through an observation position 11. Ribbon 10 may be, for example, motion picture film, magnetic or thermoplastic recording tape, or any other material which is used in ribbon form and which it is desired to cue.

In accordance with the present invention, the ribbon increment 10 of FIG. 1 bears an improved selected notch pattern cue, which in this embodiment is a single, elongated, shallow notch cut in the upper edge of the ribbon as shown more clearly in the sectional view of FIG. 2*a*. Notching instruments suitable for cutting notch patterns in the edge of a ribbon are generally well known in the art, since they have long been used in conjunction with the prior art notch-type cuing system. The design of these prior art notchers can be readily modified by one skilled in the art so as to be capable of cutting the shallower notch patterns of the present invention.

While the improved selected notch-pattern cue shown in FIGS. 1 and 2*a* resembles the conventional notch cue used in the prior art notch-type cuing system, it is substantially shallower. In fact, it has been found that the present invention permits use of a notch whose depth, measured from the film edge, is of the order of only ten thousandths of an inch, whereas with the prior art system a notch depth of at least twice that (0.02 inch) is used in 16 millimeter film and four times that (0.04 inch) in 35 millimeter film.

Of prime importance is the fact that because the particular selected notch-pattern cue shown in FIGS. 1 and 2*a* retains the same basic form as the conventional notch cue used in the prior art notch-type cuing system (particularly insofar as notch length is concerned), there is compatibility between that system and the improved system of the present invention. That is to say the substantial library of films which have previously been notch-cued for operation with the prior art system can be used, without modification or recuing, in conjunction with the improved cuing system of the present invention, since the present system is capable of detecting such prior art notch cues.

Turning now to a description of the actual apparatus shown in FIG. 1 for detecting the aforementioned improved selected notch-pattern cue, the apparatus includes means, which in the present embodiment are the components within dotted box 12, for supplying at least two beams of radiation, each along an axis which intersects the observation position 11 and any ribbon of material moving therethrough, such as ribbon 10.

In FIG. 1, box 12 includes two radiation sources 13 and 14 each of which emits a narrow beam of primarily infrared (IR) radiation along one of the axis 15 and 16 respectively. Each beam is focused at a different point lying within the observation position and in the plane established by the increment of ribbon 10. It has been found that beam widths of the order of only ten thousandths of an inch in the plane of the ribbon increment can be readily achieved, thus permitting use of notches having a corresponding depth. The radiation beams emitted along axes 15 and 16 are separated by an amount sufficient to permit both beams to fit within the single notch of a selected notch pattern cue as shown in FIGS. 1, 2*a* and 2*b* for example.

I.R. radiation is used in the present embodiment because it is assumed that ribbon 10 is movie film, and it is recognized that the emulsions used in movie film are relatively insensitive to radiation in this portion of the spectrum. Ths insures that the radiation beams from the present cuing system will not undesirably affect the visual information contained in the movie film. Obviously in other embodiments radiation other than IR can be employed.

Each of the radiation sources 13 and 14, may, for example, consists of a microminiature incandescent lamp (such as Pinlite Inc. No. L15–45) whose light output is first filtered by a Kodak Wratten No. 87C filter, for example, so as to pass only IR radiation, and then the remaining IR radiation focused as described above, by a suitable optical system such as a pair of converging lenses, as shown in the sectional view of FIG. 6.

It will be recognized that a single radiation source provided with a beam-splitter mirror arrangement might also be used to develop the requisite separate beams of radiation. Other obvious modifications of this type are within the capabilities of one having ordinary skill in the art, and therefore need not be described herein.

The apparatus of FIG. 1 also includes radiation detection means, which in the present embodiment includes the components within dotted box 17, responsive to the radiation beams generated by sources 13 and 14 and to the effect produced thereon by the movement through the observation position 11 of the ribbon increment 10 bearing a selected notch pattern cue, for developing an output cue indication each time an increment bearing the cue moves through the observation position.

In the embodiment of FIG. 1 means 17 includes two photodetector devices 18 and 19, the output signals of which are coupled to logic circuit means 20. Each photodetector is responsive to a corresponding one of the IR radiation beams from sources 13 and 14 and may be, for example, a suitable photodetector transistor such as G.E. No. L14A502.

Logic circuit means 20 may be any suitable arrangement of logic components which can perform the function of developing an output cue indication in response to the pair of signals received from photodetectors 18 and 19 each time a ribbon increment bearing only the selected notch-pattern cue moves through observation position 11. One example of an arrangement of logic components suitable for use as logic circuit means 20 is that shown in FIG. 5, which will be described in detail hereafter.

The cue indication developed at the output of logic circuit means 20 may be used to control such equipment as a movie film printer in a manner that is well known in the art.

OPERATION OF THE SYSTEM OF FIG. 1

Operation of the improved notch-type cuing system of FIG. 1 is easily understood. As the ribbon of material 10 moves through the observation position 11, the pair of IR radiation beams developed by sources 13 and 14 will intersect the ribbon 10 in the area immediately adjacent the upper edge, as shown in FIG. 2*a*. When no selected notch-pattern cue is present, the film edge will either interrupt or else attenuate the radiation beams. In either case, this condition establishes a first signal level $V_L$ in the output signals $S_{18}$ and $S_{19}$ from photodetectors 18 and 19 respectively, as shown in the signal diagram of FIG. 4*a*.

A ribbon increment 10 bearing a selected notch-pattern cue upon entering the observation position 11 will first affect the left-hand beam in FIGS. 1 and 2*a* by permitting the radiation beam to pass directly to photodetector 18, producing a level change (from $V_L$ to $V_H$) in output signal $S_{18}$ as shown in FIG. 4*a*. As the ribbon increment 10 continues moving to the right, the selected notch-pattern cue will then fall into the position shown in FIG. 2*a*, whereby both beams are simultaneously affected, thus producing a level change also in the output signal $S_{19}$ from photodetector 19, as shown in FIG. 4*a*. As the ribbon increment 10 moves further to the right, the cue will first no longer affect the radiation beam falling on detector 18 and then finally will no longer affect the radiation beam falling on detector 19, permitting the signals $S_{18}$ and $S_{19}$ to return to their original level $V_L$ as shown in FIG. 4*a*. In this manner, two signals having the unique relationship shown in FIG. 4*a* are generated by the detectors 18 and 19 in response to each selected notch-pattern cue which passes through the observation position 11. The unique relationship of these two signals is detected by logic circuit means 20, which in turn develops a final cue output indicative of the fact that a ribbon increment bearing a selected notch-pattern cue has moved through the observation position.

The pair of signals of FIG. 4*a* developed by detectors 18 and 19 in response to the passage of a selected notch-pattern cue through the observation position 11, bear a unique time relationship to one another and cannot result from spurious notches occuring in the ribbon such as may be caused by accidental nicking or scratching of the film edge. Typical signals which will be generated in response to such a spurious notch are shown in the signal diagram of FIG. 3. Furthermore, it can be seen that the unique relationship between signals $S_{18}$ and $S_{19}$ in FIG. 4*a*, exists regardless of the direction of movement of ribbon 10 through the observation position. That is, operation is the same whether the ribbon moves through the observation position from left to right as shown in FIG. 2*a*, or from right to left. The only change caused in the signals of FIG. 4*a* by reversal of the movement of ribbon 10 is a correspoding reversal or inversion of the time axis ($t$). The pulse-lengths and relative positions remain the same. It will be appreciated that this same operation will occur whenever a ribbon increment bearing a prior art notch cue moves through the observation position. Thus, it can be seen that notch-type cues (either prior art notch cues or the shallower selected notch-pattern cues of the present invention) placed at any point along the length of ribbon 10 will be reliably detected by the system of FIG. 1, regardless of the direction of movement of the ribbon through the observation position 11.

It has been shown above that the cuing system of FIG. 1 is capable of detecting either conventional prior art notch cues or the improved shallower selected notch-pattern cues of the present invention. Now, in accordance with a further aspect of the present invention and referring to FIG. 2*b*, a novel technique will be described which permits complete cancellation of either type of cue in a very simple manner.

In accordance with the present invention the selected notch-pattern cue of FIG. 2*a*, for example, can be readily cancelled by simply adding a small secondary notch on either side of the large primary notch, for example, as shown in FIG. 2*b*, thus creating a new and different notch pattern in the edge of ribbon 10. As material bearing this different notch pattern moves through the observation position from left to right, for example, photodetectors 18 and 19 will develop the signals $S_{18}$ and $S_{19}$ respectively shown in the signal diagram of FIG. 4*b*. Logic circuit means 20 is designed to recognize the unique signal pattern of FIG. 4*b* as being that corresponding to a cancelled cue and accordingly does not develop an output cue indication. It should be noted that while the different notch-pattern of FIG. 2*b* includes the selected notch pattern of FIG. 2*a*, nevertheless, logic circuit means 20 will not develop an output cue indication whenever a ribbon increment bearing the different notch pattern moves through the observation positions.

Those skilled in the art will appreciate that this novel cue cancellation technique is particularly attractive in that it is easy to implement, requiring nothing more than additional notching of the ribbon. This represents a significant advance over the prior art technique of cancelling notch-type cues by physically filling in the notch with some foreign substance in order to prevent activation of the mechanical cue sensor.

DESCRIPTION AND OPERATION OF THE LOGIC CIRCUITRY OF FIG. 5

In FIG. 5 there is shown one arrangement of logic components suitable for use as logic circuit means 20 in FIG. 1. In the circuitry of FIG. 5 the input signals from detectors 18 and 19 are shaped in a pair of pulse shaping circuits 21 and 22 which may be Schmitt triggers, for example, so as to produce relatively clean, squared-off pulses. The output of each of the pulse shapers 21 and 22 are coupled directly to inputs of the AND circuit 28 and are also coupled via a pair of signal inverters 23 and 24 to inputs of the AND circuit 25. The output and AND circuit 25 is in turn coupled via an inverter 26 to the signal input of a flip-flop 27. The signal output of flip-flop 27 supplies a third input to AND circuit 28. The output of AND circuit 28 is coupled to the series combination of an adjustable delay multivibrator 29, a relay drive multivibrator 30 and a relay 31. The output of relay 31 forms the cue output for logic circuit means 20 and may be used to control cued equipment, such as a film printer, for example. In addition, a second output of multivibrator 29 is coupled back to a reset input of flip-flop 27.

In operation, basically three different sets of signals may be received by the logic circuitry of FIG. 5 from the photodetectors 18 and 19, which must be distinguished. The first set is that of FIG. 3 representing a spurious notch caused, for example, by accidental nicking or scratching of the ribbon edge. The second set is that of FIG. 4*a* representing the actual selected notch-pattern cue shown in FIG. 2*a*. The third set is that of FIG. 4*b* representing the cancelled notch-pattern cue shown in FIG. 2*b*. The signals shown in FIGS. 3, 4*a*, and 4*b* are generated by the ribbon moving through observation position 11 from left to right. It will of course be recognized that if the direction of motion of the ribbon is reverse, similar sets of signals will still be generated, the only difference being an inversion of the time axis in each figure.

In describing the operation of the logic circuitry of FIG. 5 it will be assumed that the initial conditions are that the output of each of the pulse shaper circuits 21 and 22 are low, or in a binary "0" state, and that the output from flip-flop 27 is high, or in a binary "1" state with an uncued ribbon increment in the observation position. AND circuits 25 and 28 are such that their outputs are high, or in a "1" state only when all inputs are simultaneously low, or in a "0" state.

Given the above initial conditions it can be seen that a set of signals such as those of FIG. 3, representing a spurious notch, when applied to the logic circuitry of FIG. 5 will cause it to function in accordance with the logic table of FIG. 7, producing no "1" output from AND circuit 28. Thus, spurious notches will not produce erroneous output cue indications from the cuing system of FIG. 1.

A set of signals such as those of FIG. 4*a*, representing the presence of a selected notch-pattern cue, when applied to the logic circuitry of FIG. 5 will cause it to function in accordance with the logic table of FIG. 8, producing a "1" output from AND circuit 28 as shown. The signal from AND circuit 28 activates multivibrator 29, which, after a selected delay, in turn activates multivibrator 30 causing the contacts of relay 31 to close, for example, thus producing an output cue indication. The adjustable delay introduced by multivibrator 29 is intended to compensate for variations encountered in the physical location of radiation source 12 and detectors 18 and 19 in relation to the equipment being controlled. In addition, upon being activated by a signal from AND circuit 28, multivibrator 29 returns a reset signal to flip-flop 27, thus returning the logic circuitry to its initial conditions so that the next occurring cue can be detected. This reset arrangement also insures that the logic circuitry is automatically returned to its initial conditions each time the system is turned on.

Finally, a set of signals such as those of FIG. 4*b*, representing the presence of a cancelled cue when applied to the logic circuitry of FIG. 5 will cause it to function in accordance with the logic table of FIG. 9. It can be seen that this set of signals cannot produce a "1" output from AND circuit 28. Therefore, no output cue indication will be generated and the notch-pattern cue will have been effectively cancelled, in that it can no longer elicit an output cue indication from the logic circuit means 20.

Correspondingly, if ribbon 10 in FIG. 2*b* is moved through the observation position 11 from right to left instead of from left to right, a set of signals similar to that of FIG. 4*b*, only having an inverted time axis, will be generated again representing the presence of a cancelled selected notch-pattern cue. These signals, when applied to the logic circuitry of FIG. 5 will cause it to function in accordance with the logic table of FIG. 10. It can be seen that this set of signals also will not produce a "1" output from AND circuit 28. Therefore, regardless of the direction of movement of the ribbon 10 through the observation position 11, a notch-pattern cue which is cancelled in accordance with the present invention by converting the selected notch pattern to a different notch pattern through the addition of a secondary notch as shown in FIG. 2*b*, for example, will not cause a cue indication to be developed at the output of the logic circuit means 20. Thus, it can be seen that the cue cancellation system of the present invention is simple, easily implemented, and reliable, regardless of the direction of movement of the ribbon through the observation position.

In summary, therefore, the invention disclosed herein spawns an altogether new and different class of cuing systems which, while exhibiting significant advances over prior art systems, nevertheless remain compatible therewith. In accordance with the invention, cuing systems of this new class will exhibit the general characteristics of using two or more radiation beams to detect the presence of a selected pattern of particularly shallow notches in the edge of a ribbon of material as the ribbon moves through an observation position. In addition, the selected notch pattern will be cancellable by the mere addition of one or more secondary notches thereto.

While there has been described hereinabove what is at present considered to be a preferred embodiment of the invention, in the form of a particular cuing system exhibiting the advantages characteristic of the new class of cusing systems made possible by the present invention, nevertheless it will be obvious to those skilled in the art that various changes and modifications may be made therein without departing from the invention. It is therefore intended to cover all such changes and modifications as fall within the true spirit and scope of the invention.

What is claimed is:

1. Apparatus for detecting the presence of a selected notch-pattern in a moving-ribbon of material, as said material moves through an observation position, comprising:

means for supplying at least two beams of radiation, along axes which intersect said observation position and any ribbon of material moving therethrough, which radiation illuminates substantially only that portion of said ribbon wherein said notch pattern may occur, said notch pattern being of sufficient length to pass said beams simultaneously;

and radiation detection means, responsive to said beams of radiation and to the effect produced thereon by the movement through said observation position of an increment of said ribbon bearing said selected notch pattern for developing an output indication each time an increment bearing said selected notch pattern moves through said observation position.

2. Apparatus in accordance with claim 1 wherein said means for supplying radiation supplies each beam focused at a different point lying within said observation position and in the plane established by ribbon moving therethrough, such that said points are traversed only by the portion of said ribbon wherein said selected notch pattern may occur.

3. Apparatus for detecting the presence of a selected notch-pattern in a ribbon of material, as said material moves through an observation position, comprising:

means for supplying at least two beams of radiation, along axes which intersect said observation position and any ribbon of material moving therethrough, which radiation illuminates substantially only that portion of said ribbon wherein said notch pattern may occur, said notch pattern being of sufficient length to pass said beams simultaneously;

a pair of radiation detectors, each responsive to a corresponding one of said beams and to the effect produced thereon by the movement through said observation position of an increment of ribbon bearing a notch pattern, for developing a corresponding pair of signals representative of the notch pattern each time an increment bearing a notch pattern moves through said observation position;

and logic circuit means, responsive to the signals from said radiation detectors, for producing an output indication in response to signals representative of said selected notch pattern, thereby indicating the passage through said observation position of a ribbon increment bearing only said selected notch pattern.

4. Apparatus for detecting the presence of a selected notch pattern in a moving ribbon of material, as said material moves through an observation position, comprising:

means for supplying at least two substantially parallel beams of radiation, each along an axis which intersects said observation position and any ribbon of material moving therethrough, and each focused at a different point lying within said observation position and in the plane established by ribbon moving therethrough, such that said points are traversed by said selected notch pattern as a ribbon increment bearing said pattern moved through said observation position and such that said radiation illuminates substantially only that portion of said ribbon wherein said notch pattern may occur, said notch pattern being of sufficient length to pass said beams simultaneously;

a pair of radiation detectors each responsive to a corresponding one of said beams and to the effect produced thereon by the movement through said observation position of an increment of ribbon bearing a notch pattern, for developing a corresponding pair of signals representative of the notch pattern each time an increment bearing a notch pattern moves through said observation position;

and logic circuit means, responsive to the signals from said radiation detectors, for producing an output indication only in response to signals representative of said selected notch pattern, thereby indicating the passage through said observation position of a ribbon increment bearing only said selected notch pattern.

5. Apparatus for detecting the presence of a selected notch pattern in a ribbon of material, as said material moves through an observation position, comprising:

a pair of subminiature incandescent lamps for supplying at least two beams of radiation, a pair of filters each associated with a corresponding one of said lamps, for passing primarily only the infra-red components of the lamps' radiation, and a pair of optical systems each associated with a corresponding one of said filters, for focusing the infra-red radiation passed by each filter at a different point lying within said observation position and in the plane established by ribbon moving therethrough such that said points are traversed by said selected notch pattern as a ribbon increment bearing said pattern moves through said observation position;

and radiation detection means, responsive to said beams of radiation and to the effect produced thereon by the movement through said observation position of said ribbon increment, for developing an output indication each time an increment bearing said selected notch pattern moves through said observation position.

6. Apparatus for detecting the presence of a selected notch pattern, in a ribbon of material, as said material moves through an observation position, comprising:

means for supplying at least two beams of radiation, each along an axis which intersects said observation position and any ribbon of material moving therethrough;

a pair of radiation detectors, each responsive to a corresponding one of said beams and to the effect produced thereon by the movement through said observation position of an increment of ribbon bearing a notch pattern, consisting of a substantially rectangular shaped notch having length greater than its depth, for developing a corresponding pair of signals representative of said notch pattern each time an increment bearing said notch pattern moves through said observation position;

and logic circuit means, responsive to the signals from said radaition detectors, for producing an output indication only in response to signals representative of said notch pattern, thereby indicating the passage through said observation position of a ribbon increment bearing only said selected notch pattern.

7. Apparatus for detecting the presence of a selected notch pattern in a ribbon of material, as said material moves through an observation position, comprising:

means for supplying at least two beams of radiation, each along an axis which intersects said observation position and any ribbon of material moving therethrough;

a pair of radiation detectors, each responsive to a corresponding one of said beams and to the effect produced thereon by the movement through said observation position of an increment of ribbon bearing a notch pattern, for developing a corresponding pair of signals representative of the notch pattern each time an increment bearing a notch pattern moves through said observation position;

and logic circuit means, responsive to the signals from said radiation detectors, for producing an output indication in response to signals representative of said selected notch pattern and for producing no output indication in response to signals representative of a different notch pattern consisting of said selected notch pattern and an additional secondary notch, thereby indicating the passage through said observation position of a ribbon increment bearing only said selected notch pattern.

8. Apparatus for detecting the presence of a selected notch pattern in a moving ribbon of material, as said material moves through an observation position, comprising:

means for supplying at least two substantially parallel beams of radiation, each along an axis which intersects said observation position and any ribbon of material moving therethrough, and each focused at a different point lying within said observation position and in the plane established by ribbon moving therethrough, such that said points are traversed by said selected notch pattern as a ribbon increment bearing said pattern moves through said observation position;

a pair of radiation detectors each responsive to a corresponding one of said beams and to the effect produced thereon by the movement through said observation position of an increment of ribbon bearing a notch pattern, for developing a corresponding pair of signals representative of the notch pattern each time an increment bearing a notch pattern moves through said observation position;

and logic circuit means, responsive to the signals from said radiation detectors, for producing an output indication in response to signals representative of said selected notch pattern and for producing no output indication in response to signals representative of a different notch pattern consisting of said selected notch pattern and an additional secondary notch, thereby indicating the passage through said observation position of a ribbon increment bearing only said selected notch pattern.

9. Apparatus in accordance with claim 8, wherein said logic circuit means develops an output indication each time an increment bearing only a selected notch pattern consisting of a single, substantially rectangular shaped notch having a length greater than its depth, moves through said observation position.

10. Apparatus in accordance with claim 9, wherein said means for supplying radiation includes a pair of subminiature incandescent lamps, a pair of filters, each associated with a corresponding one of said lamps, for passing primarily only the infra-red components of the lamps' radiation, and a pair of optical systems, each associated with a corresponding one of said filters, for focusing the infra-red radiation passed by each filter at a different point lying within said observation position and in the plane established by the ribbon moving therethrough, such that said points are traversed by said selected notch pattern as a ribbon increment bearing said pattern moves through said observation position.

References Cited

UNITED STATES PATENTS

| | | | |
|---|---|---|---|
| 2,985,764 | 5/1961 | Von Koenig | 250—219 |
| 2,986,967 | 6/1961 | Albert et al. | 355—41 |
| 3,267,800 | 8/1966 | Baillod | 355—43 |
| 3,284,923 | 11/1966 | Leslie | 353—26 |
| 3,299,272 | 1/1967 | Furukawa et al. | 250—209 X |

WALTER STOLWEIN, Primary Examiner

U.S. Cl. X.R.

250—209; 353—26